United States Patent Office 2,817,683
Patented Dec. 24, 1957

2,817,683
PREPARATION OF THIO-OXAMIC ACID

Rudi F. W. Rätz, Columbus, Ohio, assignor to Olin Mathieson Chemical Corporation, a corporation of Virginia No Drawing. Application December 5, 1956
Serial No. 626,293

5 Claims. (Cl. 260—534)

My invention relates to the preparation of thio-oxamic acid.

Thio-oxamic acid,

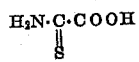

is known only in form of its alkali salts and derivatives such as esters, amides, etc. The literature states that thio-oxamic acid is not capable of existing in the free state (A. Weddige, J. Pr. Ch. [2] 9, 137 [1874]). All attempts to prepare the free acid from alkali metal salts, even under mild conditions, have resulted in failure. For example, the reaction of a salt of thio-oxamic acid with an acid has been unsuccessful and has resulted in rapid decomposition with the formation of elementary sulfur.

By the process of my invention, free thio-oxamic acid is easily and conveniently prepared. The process of my invention comprises admixing an alkali metal salt of thio-oxamic acid with a dilute mineral acid and immediately extracting the free thio-oxamic acid formed with an organic water-immiscible solvent. For example, an aqueous solution of potassium thio-oxamate is mixed with an equivalent amount of 1N hydrochloric acid and the liberated thio-oxamic acid is immediately extracted with an organic water-immiscible solvent, for example, ether. Dissolved in an organic solvent, the thio-oxamic acid is entirely stable. The yellow prismatic crystals of the acid, M. P. 113° C., which are obtained from the concentrated solutions of the above mentioned solvents, are stable and can be stored for an unlimited time without any sign of decomposition.

The step of extracting thio-oxamic acid from the aqueous solution can be carried out in different ways. For large scale production continuous liberation of the acid from the alkali salt connected with continuous extraction in the usual liquid-liquid extraction columns can be used. For laboratory purposes, the extraction can be carried out by a simple shaking-extraction in a separatory funnel.

Because of the presence of a free carboxylic group and the thioamide group, the acid is a highly reactive substance. Therefore, it is a valuable product for the synthesis of new compounds which cannot be prepared from the known salts of thio-oxamic acid. For example, it can be used to prepare carboxy-formamidrazone,

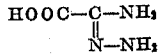

by reacting the acid with hydrazine as described in my pending application Serial No. 626,292, filed December 5, 1956.

The carboxy-formamidrazone thus formed is especially suited for the synthesis of heterocyclic compounds. For instance, by heating to 220° C. it is conveniently and easily converted into 4-amino-1,2,4-triazole. In a process set forth in Japanese Patent 2,661 (July 18, 1952) 4-amino-1,2,4-triazole is utilized in preparing highly viscous gelatin solutions used in the manufacture of photographic film.

The compound 4-amino-1,2,4-triazole is also a valuable herbicide as shown by Jackson, W. D. and Polya, J. B. in Australian J. Science, 13, 149–150, 1951 (C. A. 45, 6699) and by Shaw, W. C. and Swanson, C. R. in Weeds, 2, 43, 1953 (C. A. 47, 11638). This same compound has been found useful for chemical defoliation and regrowth inhibition of cotton by Hall, W. C., Truchelut, G. B., and Lane, H. C., (Texas Agr. Expt. Sta. Bull. No. 759, 3–24; C. A. 47, 12735).

The temperature of the neutralization reaction of the hydrochloric acid with alkali metal thio-oxamate is not particularly critical. The reaction must be carried out, however, at a temperature below the decomposition temperature of the free acid, i. e. 113° C. In general, the reaction temperature is varied from about 0° to 25° C. In carrying out the neutralization reaction a slight excess of the mineral acid should be continuously maintained. It is important, however, that the free thio-oxamic acid, once formed, be removed immediately from the reaction zone by the extraction process described above.

By the term, organic water-immiscible solvents useful for the extraction of the thio-oxamic acid from the aqueous reaction mixture, I mean solvents that are not soluble in water in all proportions and that are capable of forming two phases, i. e. an organic phase containing the thio-oxamic acid and a water phase. Such solvents are well-known. Even though some of the solvents can be partly soluble in water and thus carry some thio-oxamic acid with them into the water phase, such solvents are useful. Examples of such solvents are the normally-liquid organic solvents including the ethers such as diethyl ether and dibutyl ether, the higher alcohols such as n- and sec-butyl alcohol and amyl alcohol and esters such as the acetates, e. g. methyl acetate an butyl acetate.

The useful mineral acids include hydrochloric, sulfuric, nitric and phosphoric acids. The acids should be of a dilution in water ranging from about 3 to 10 percent.

The useful alkali metal salts of the thio-oxamic acid include the potassium, sodium and lithium salts.

The process of my invention will be further illustrated by reference to the following example.

14.3 grams of potassium-thio-oxamate (0.1 mole) were dissolved in 100 milliliters of 1 normal hydrochloric acid and the obtained clear solution immediately extracted with four portions of 20 milliliters each of diethylether. The combined ethereal extracts were dried over sodium sulfate and finally the solvent removed in a vacuum at room temperature. The remaining crystalline yellow residue was recrystallized once from chloroform and yellow prismatic crystals of free thio-oxamic acid were obtained. The melting point of this compound was 113° C. under decomposition.

The yield of thio-oxamic acid was 8.27 grams which is equal to 78 percent of the theoretical yield, based on the potassium thio-oxamate charged. The analysis of the product was:

| | C | H | N | S |
|---|---|---|---|---|
| Calcd. for C₂H₃O₂NS | 22.83 | 2.85 | 13.32 | 30.42 |
| Found | 22.93 | 2.85 | 13.28 | 30.31 |
| | 22.75 | 2.81 | 13.37 | 30.41 |

I claim:

1. The process of preparing thio-oxamic acid which comprises admixing an aqueous solution of an alkali metal salt of thio-oxamic acid with a dilute mineral acid and immediately extracting from the aqueous reaction mixture the thio-oxamic acid formed with an organic water-immiscible solvent while maintaining the temperature below the decomposition temperature of the free thio-oxamic acid.

2. The process of claim 1 in which the mineral acid is hydrochloric acid.

3. The process of claim 1 in which the temperature is maintained at about 0° to 25° C.

4. The process of claim 2 in which the temperature is maintained at about 0° to 25° C.

5. The process of claim 1 in which the alkali metal is potassium.

No references cited.